United States Patent [19]

Hwang et al.

[11] Patent Number: 4,734,874

[45] Date of Patent: Mar. 29, 1988

[54] CORDLESS COMPUTER ASSEMBLY

[75] Inventors: Hewon Hwang, Somerville; John C. Killian, Jr., Sudbury; Jeffrey M. Lewis, Maynard; Victor M. Samarov, Carlisle, all of Mass.

[73] Assignee: Digital Equipment Corporation, Maynard, Mass.

[21] Appl. No.: 862,007

[22] Filed: May 12, 1986

[51] Int. Cl.⁴ .............................................. G06F 1/00
[52] U.S. Cl. ..................................... 364/708; 361/391
[58] Field of Search ........ 364/708, 709, 200 MS File; 364/900 MS File; 312/208, 293-295; 361/413, 415, 390, 391; 340/720; D14/100, 114

[56] References Cited

U.S. PATENT DOCUMENTS

| | | | |
|---|---|---|---|
| 4,530,066 | 7/1985 | Ohwaki et al. | 364/708 |
| 4,530,069 | 7/1985 | Desrochers | 364/900 |
| 4,577,928 | 3/1986 | Brown | 350/276 R |
| 4,585,202 | 4/1986 | Parsfkian | 248/553 |
| 4,680,674 | 7/1987 | Moore | 361/395 |

OTHER PUBLICATIONS

IBM Technical Disclosure Bulletin, "*Industrial Personal Computer for Class C Industrial Environment*", vol. 28, No. 7, Dec. 1985, pp. 2785–2798.
IBM Technical Disclosure Bulletin, "*Extension Device for a Personal Computer*", vol. 27, No. 12, May 1985, pp. 6887–6889.

Primary Examiner—Gary V. Harkcom
Assistant Examiner—Tan V. Mai
Attorney, Agent, or Firm—Cesari and McKenna

[57] ABSTRACT

An expansion unit (24) that adds functions to a main computer unit (12) connects to it without cabling. The main unit (12) rests on the expansion unit, and electrical connections between the two units are thereby made automatically by complementary connectors (36, 134) on the upper surface (22) of the expansion unit and the lower surface (20) of the main unit. To insure engagement of the connectors, which the user cannot see when the main unit (12) is placed on the expansion unit (24), locating pins (26, 28) are provided on the upper surface (22) of the expansion unit (24), and guide surfaces (52, 60) guide the pins (26, 28) into the proper position as the main unit is being lowered. The two units (12, 24) are thereby properly positioned with respect to each other. To accommodate tolerances in the positioning of the connectors within the unit, the connector (36) on the expansion unit (24) is allowed to move slightly with respect to the main unit (12), and further guide surfaces (66) guide the connector (36) on the expansion unit (24) into engagement with the connector (134) in the main unit (12).

8 Claims, 6 Drawing Figures

CORDLESS COMPUTER ASSEMBLY

BACKGROUND OF THE INVENTION

The present invention relates to computer assemblies. It has particular, although not exclusive, application to so-called personal computers, which typically are kept on a desktop.

Computers to be used in different applications need different capabilities. Some users need a relatively large amount of memory, the ability to communicate with other computers, or the ability to perform complicated graphics. Since not all users need all of these capabilities, however, computer vendors ordinarily produce a basic model that does not have all of those features but is arranged to allow additional hardware to be added more or less easily. For instance, slots for extra boards are provided in the basic unit, and the user can add the extra hardware as he needs it.

The provision of expansion slots presents a problem, however, since the extra slots mean extra space, and it is important in the typical personal-computer environment that the unit take up as little space on the desktop as possible. This problem can be avoided by keeping the basic unit as small as possible and providing for expansion by means of hardware in a separate housing. However, although this keeps the space requirement for the basic unit small, the assembly that results when the expansion unit is added can appear unsightly and unkempt because the connections between the circuitry in the two units must be made by conductors external to the housings.

The object of the present invention is to achieve a minimal-size basic unit but provide for expansion without the unsightly connection apparatus that usually accompanies expansion modules. Another object is to provide a convenient way to add features to a basic computer unit.

SUMMARY OF THE INVENTION

The foregoing and related objects are achieved in a computer assembly in which a main computer unit is connected to an expansion unit merely by being placed on top of it; connections are made at the abutting housing walls of the two units. The bottom wall of the main-unit housing has a recess in which is disposed at least one connector by which electrical access can be had to the signal paths to which peripheral devices must be connected in order to operate in cooperation with the computer in the main unit. The expansion unit has a mating connector adapted to mate with the connector in the main unit. The expansion unit also has locating pins on the upper surface of its housing that mate with locating recesses provided in the bottom wall of the main unit. Guide surfaces that converge to the locating recesses surround those recesses so that, when the main unit is placed on the expansion unit, the guide surfaces guide the locating pins into the locating recesses. This positions the units with respect to each other in such a way that the main- and expansion-unit connectors engage even though the user cannot see them to guide them together. With this type of assembly, all of the connections are made at the mechanical interface between the main unit and the expansion unit so that the esthetic penalty normally attendant upon the use of an exterior expansion unit is not incurred.

The invention is defined with more particularity in the appended claims.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

Figure 1:
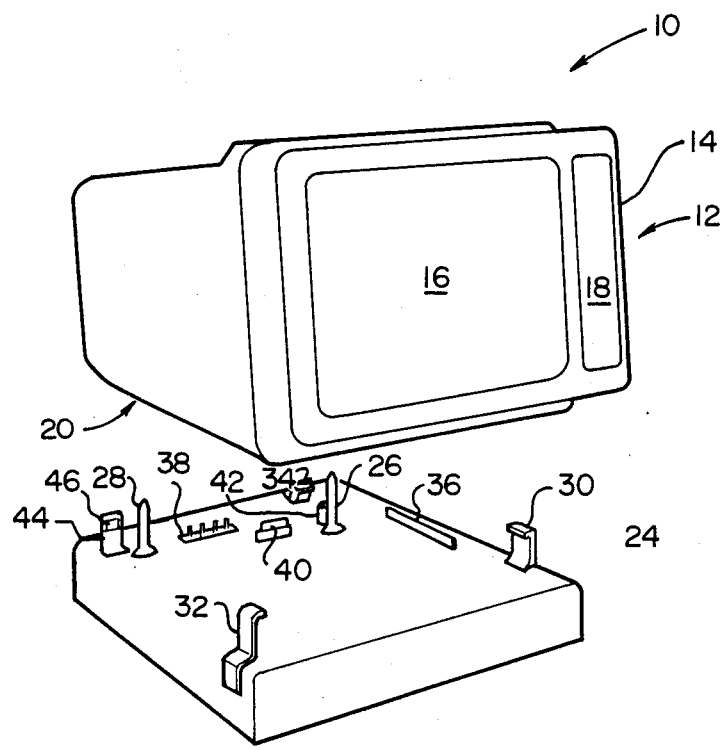
FIG. 1 is a perspective view of the assembly of the present invention with the main unit separated from the expansion unit.

FIG. 1 depicts the computer assembly 10 of the present invention. A main unit 12 includes a housing 14 that contains the computer circuitry as well as a cathode-ray tube whose screen 16 is shown in the drawing. The main unit may also include a disk drive to which access is afforded by an access door 18.

Figure 2:
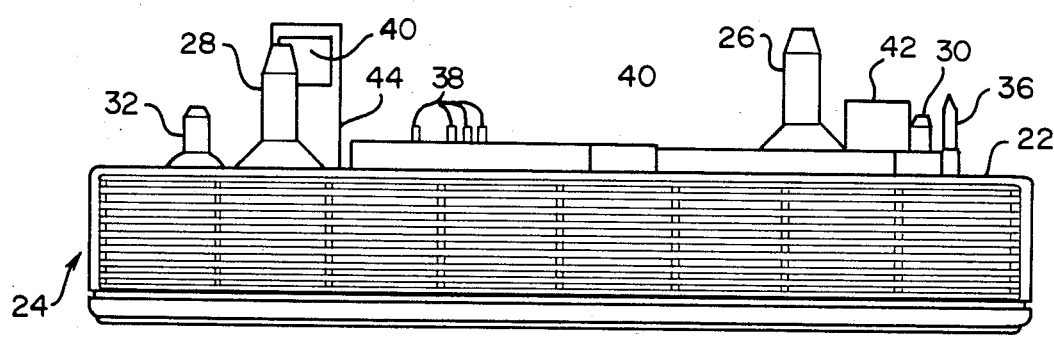
FIG. 2 is a front elevation of the expansion unit.
Figure 3:
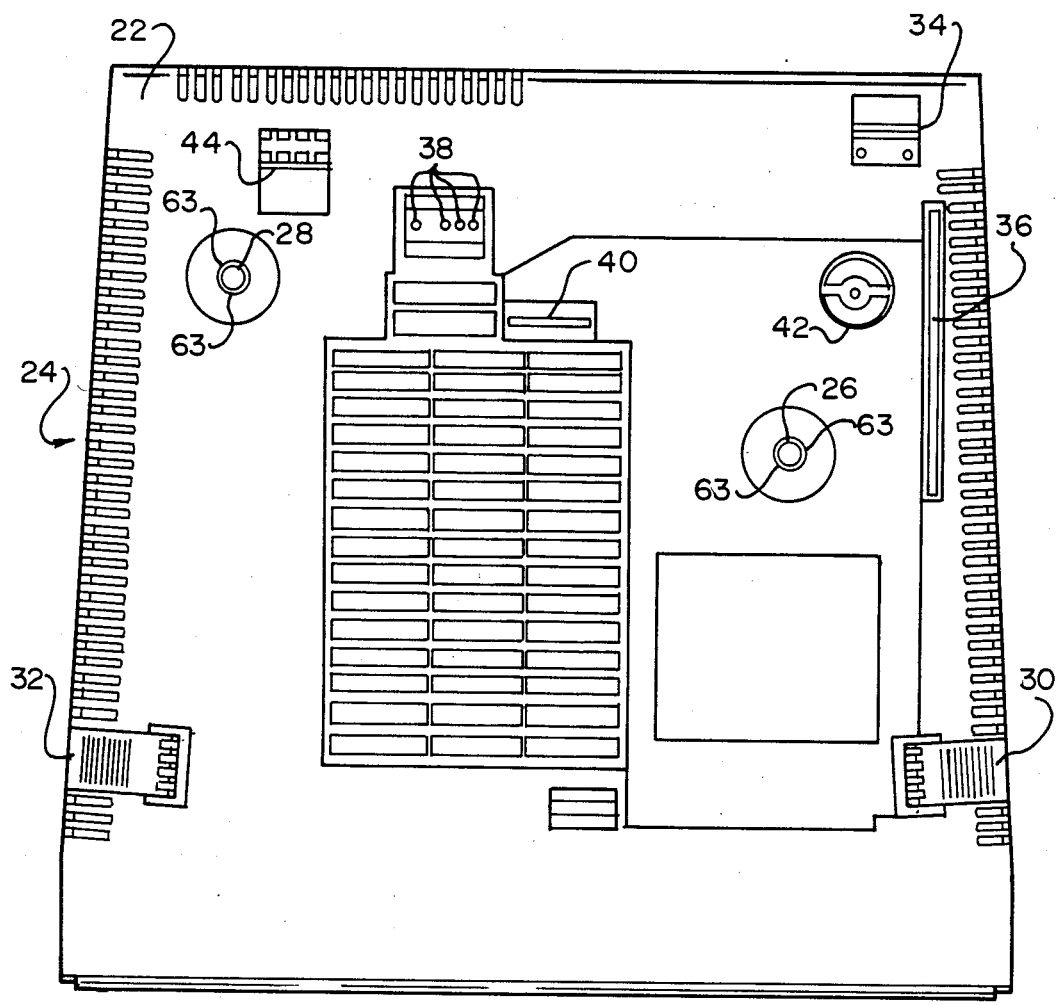
FIG. 3 is a plan view of the expansion unit.

The bottom surface 20 of the main unit is arranged to mate with the top surface 22 of an expansion unit 24. As can best be appreciated by simultaneous reference to FIGS. 1, 2, and 3, the upper surface 22 of the expansion unit 24 forms two upward-extending locating pins 26 and 28, which are received in the bottom surface 20 of the main unit to place other elements of the two units in proper registration. Latches 30 and 32 on the sides of the expansion unit 24 serve to hold the expansion unit 24 to the main unit 12 when the main unit 12 has been placed on the expansion unit 24. An edge connector 36 protrudes through the upper surface 22 for engagement with a female connector accessible through the bottom surface 20 of the main unit 12.

In addition to the electrical connections provided by the edge connector 36, another connector, which includes prongs 38, obtains power from the main unit by means of a complementary power connector in the main unit 12. A ground plate 40 engages a ground connection in the main unit.

When the units are connected, the static friction between the connectors tends to hold the expansion unit 24 to the main unit 12 even without the latches. If the expansion unit 24 were heavier, this friction would be overcome when the main unit is lifted after unlatching, so the units 12 and 24 could readily be separated by unlatching and then simply lifting the main unit 12. However, the expansion unit 24 is relatively light, so gravity cannot be counted on to provide the required separation force. A spring holder 42 is therefore provided. The spring holder contains a spring (not shown) that exerts extra force against the main unit 12 to tend to separate it from the expansion unit 24. When the units 12 and 24 are unlatched, this spring overcomes the frictional forces and separates the two units as the user lifts the main unit.

Power is supplied to the main unit by a power plug (not shown) that plugs into a socket (also not shown) in the back of the main unit 12. If a user tries to place the main unit on the expansion unit while the power cord is plugged in, an interlock bracket 44 will impinge against the plug and prevent the two units from being connected. After the user has connected the two units with the main unit unplugged, he inserts the power plug through an interlock-bracket opening 46 and into the power socket. With the plug thus inserted through the opening 46, the user cannot remove the main unit 12 from the expansion unit 24 until he has removed the plug.

Figure 4:
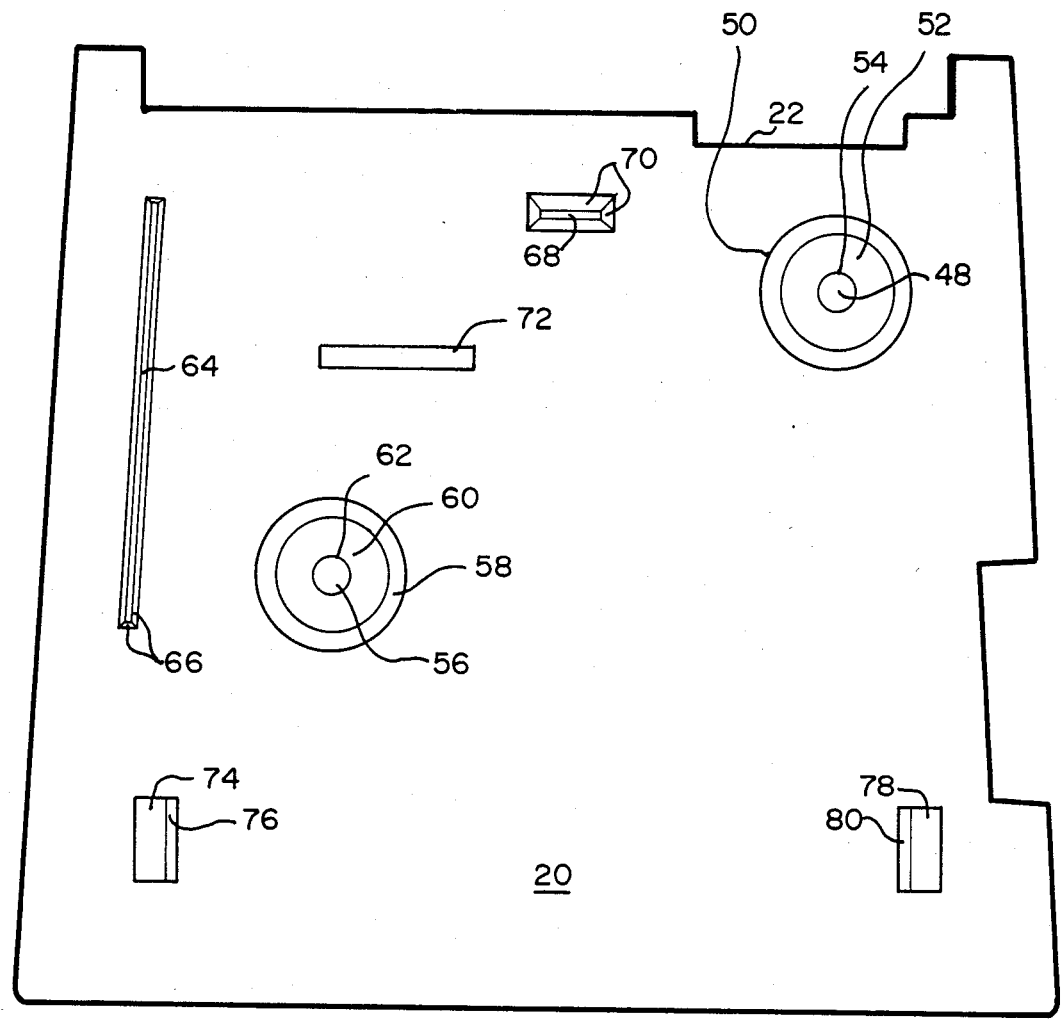
FIG. 4 is a bottom view of the main unit.

The features of the main unit that are complementary to those of the upper surface of the expansion unit are depicted in FIG. 4. A locating recess 48 for receiving locating pin 28 is surrounded by an annular foot 50 and a frustoconical guide surface 52 and defined by a cylindrical locating surface 54. A second locating recess 56 for receiving locating pin 26 is slightly elongated in the direction radial of the center of recess 48. Recess 56 is surrounded by a foot 58 and a guide surface 60. The guide surface 60 converges to recess 56, which is defined by surface 62. With the exception of the elongation, foot 58 and surfaces 60 and 62 are similar to the foot 50 and surfaces 52 and 54 of recess 48.

Resilient "crush" ribs 63 (FIG. 3) extend longitudinally along the side surfaces of pins 26 and 28. With the aid of these ribs, which are resiliently deformed by the locating surfaces 54 and 62, recess 48 serves to locate locating pin 28 very precisely in absolute position, while recess 56 serves to locate locating pin 26 very precisely in its angular position with respect to the center of locating recess 48. Because of the guide surfaces, all the user has to do is make a very rough initial positioning of the pins; the guide surfaces and gravity do the rest.

With the two units located very precisely with respect to each other, the other mating parts readily come into engagement. An opening 64 in the bottom surface 20 of the main unit 12 provides access to a connector to be described below. Guide surfaces 66 surround the recess 64 to guide the edge connector 36 into place. To accommodate tolerances, the edge connector 36 (FIG. 2) is allowed to "float" a little with respect to the expansion unit 24 in which it is mounted, and it can thereby be guided by guide surfaces 66 into the proper position independently of its initial position with respect to the locating pins 26 and 28.

A further opening 68, surrounded by guide surfaces 70, is positioned to receive the prongs 38 of the expansion-unit power connector and to admit them into connection with a complementary connector (not shown) inside the expansion unit 24. An opening 72 is also provided for the ground plate 40.

Latch 30 is received in an opening 74 adjacent to which the bottom housing wall 20 forms a shoulder 76 on which latch 30 is to catch. A similar opening 78 receives latch 32, which catches on a similar shoulder 80. The rear edge 82 of the bottom wall serves as a catch shoulder for the rear latch 34.

Figure 5:
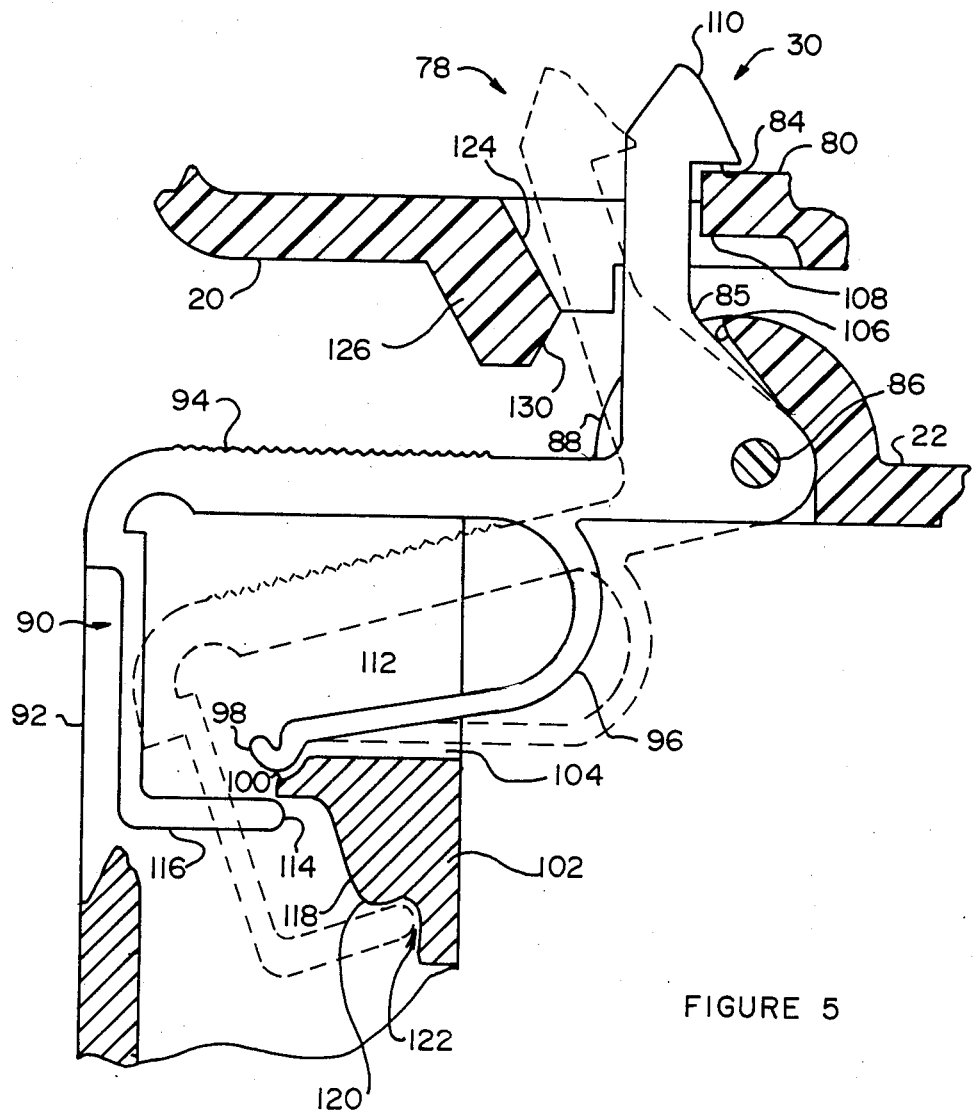
FIG. 5 is a cross-sectional view of the openings in the main- and expansion-unit housings that receive one of the latches by which the main unit is mechanically connected to the expansion unit.

FIG. 5 illustrates the operation of latch 30. Latch 32 operates in a manner similar to that in which latch 30 does. Latch 30 forms a latch chin 84 on a vertical arm 85. Chin 84 catches on shoulder 80 of the main-unit bottom wall to hold the two units together. A stub shaft 86 is journaled in a bearing 88 formed in the upper wall 22 of the expansion unit 24 so that latch 30 pivots about the axis of the shaft 86. Latch 30 fits in an opening 90 in the side wall 92 of the expansion unit and has a grooved surface 94 substantially flush with the upper surface 22 of the expansion unit 24. The user presses on this surface to unlatch the units.

A curved spring 96 is integrally molded with the latch 30 and has a curved end 98 that bears against a seat 100 in a catch block 102. Catch block 102 is supported on one side by a support wall 104. Another support wall (not shown) supports it on the other side. In the position shown in FIG. 5, the spring 96 is stressed to tend to pivot the latch 30 in the clockwise direction, while a stop member 106 prevents it from pivoting any farther in that direction. In this way, the latch remains in the position shown.

The latch 30 is shown in FIG. 5 with the expansion unit 24 already latched to the main unit 12. The illustrated angular orientation is also the one that the latch 30 normally assumes before it is attached to the main unit. When the main unit 12 is lowered into place, the lower edge 108 of the main-unit bottom wall forming the latch opening 78 hits a cam surface 110 of the latch 30, causing it to pivot counterclockwise against the torque applied by the spring 96. This moves the latch out of the way so that the shoulder 80 can move past the chin 84. Once this is accomplished, latch 30 pivots clockwise back again to latch onto the shoulder 80 formed by the main unit 12.

To remove the main unit 12 from the expansion unit 24, the user first depresses latches 30 and 32. This causes each latch to assume the position depicted by phantom 112; as the user depresses latch 30, latch 30 pivots counterclockwise, and the tip 114 of an L-shaped catch spring 116 integrally formed thereon comes into contact with a cam surface 118 of the catch block 102. This causes catch spring 116 to bend backward somewhat, reaching its point of greatest stress when it reaches tip 120 of cam surface 118. If the user continues to depress the latch 30 beyond this point, the force of spring 116 urges its tip 114 into catch recess 122, and the latch thereby snaps into the position that the phantom 112 depicts. This is a stable position, so latch 30 (and similarly latch 32) remains open while the user proceeds with the remainder of the removal operation.

To complete the removal operation, the user depresses latch 34, which has only a single stable position and is not shown in detail in the drawings. Depression of latch 34 frees edge 82, which accordingly raises in response to the force of the spring in the spring holder 42 to a level beyond which latch 34 can catch it. It is for this reason that latch 34 does not have to have two stable positions. The user then simply lifts the main unit. The combined gravity and spring forces separate the two units.

When the user lifts the main unit 12, a cam surface 124 on a downward-protuberant lip 126 provided on the bottom main-unit wall meets the rear surface 128 of the vertical arm 85 and urges it to the right so that latch 30 pivots clockwise and the latch-spring tip 114 passes the cam-surface tip 120 so that the latch 30 returns to the position shown in solid in FIG. 5

It was stated above that the latch 30 is normally in this position when the main unit 12 is lowered onto the expansion unit 24. It may sometimes happen, though, that the user accidentally places the latch 30 in the position depicted in phantom in FIG. 5. If this happens, lowering of the main unit 12 will cause the latch 30 to move back to the position shown in solid in FIG. 5. Specifically, a second cam surface 130 on the lip 126 will meet the rear surface 128 of the arm 85 and urge the arm far enough to the right that the latch resumes the clockwise stable position.

The combination of the type of latches described above with the separation spring is advantageous in this application because the latches require no extra room for operation. In contrast, the levers that would ordinarily be used for cam-type or zero-insertion-force connectors, which one might use instead of the illustrated frictional connectors in order to facilitate removal, would typically have to pivot laterally outward from the housings of the units, thereby requiring extra space on the desktop.

The cooperation of the locating surfaces 54 and 62 (FIG. 4) with the locating pins 26 and 28 (FIG. 3), respectively, locates the housings of the two units precisely with respect to each other. As was mentioned above, however, there may be tolerances in the positioning of connectors within the housing, and these are accommodated by allowing certain parts to "float" slightly and providing guide surfaces to guide the floating parts into place.

Figure 6:
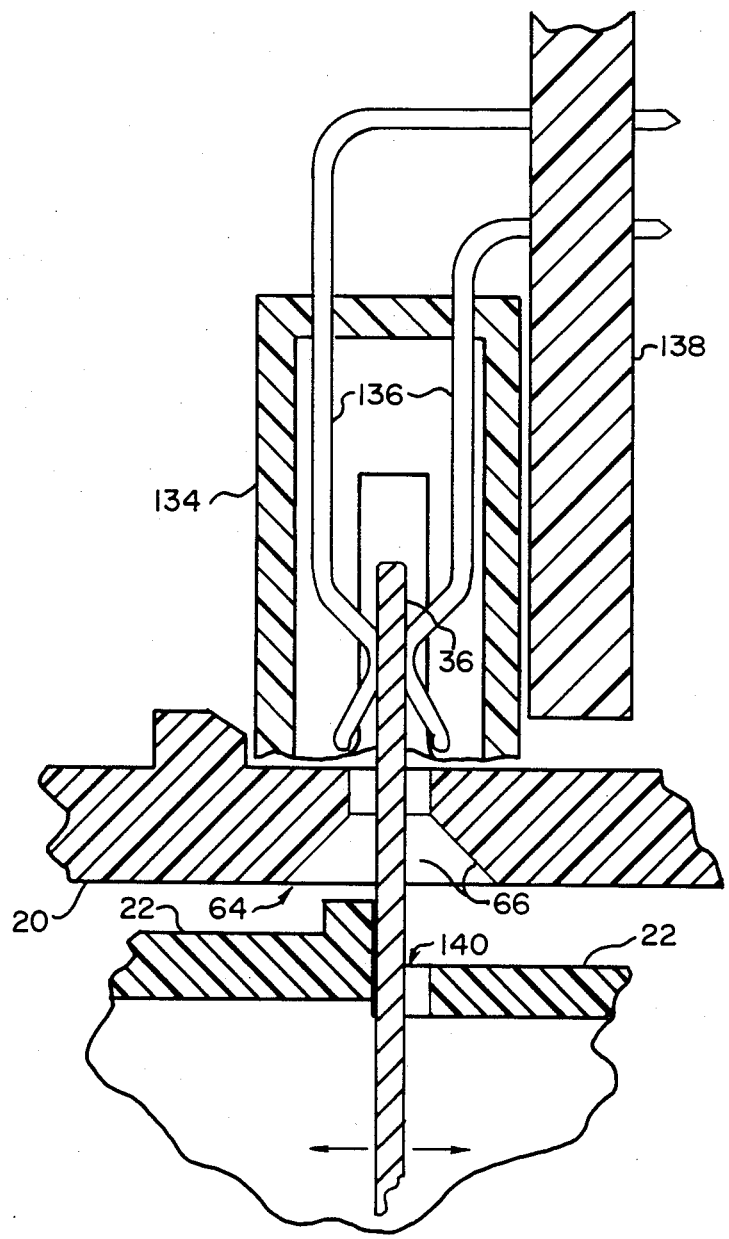
FIG. 6 is a cross-sectional view of connectors by which electrical communication is provided between the two units.

An example of this method is depicted in FIG. 6. Opening 64 in the bottom wall of the main unit opens into a connector 134 having opposed pairs of spring contacts 136 that make contact with conductive regions on the edge connector 36. These contacts also make connections to a circuit board 138 in the interior of the main unit and thereby provide electrical communication between the peripheral devices in the expansion unit and the signal paths to which they must have access in order to operate in cooperation with the computer in the main unit 12. The edge connector 36 is secured in the expansion unit 24 in such a fashion that it is allowed a small amount of movement in the opening 140 by which it protrudes from the interior of the expansion unit 24. Because of this ability to move, guide surfaces 66 in opening 64 can guide the connector 36 into the proper position for engagement with connector 134.

By the use of this arrangement, little or no esthetic penalty accompanies the addition of hardware external to the main unit, so it becomes more acceptable to eliminate most or all of the extra space that would otherwise be allocated to future expansion. This arrangement thereby facilitates minimization of the space required by the main unit. It thereby constitutes a significant advance in the art.

We claim:

1. A computer assembly comprising:
   A. a computer main unit including a main housing and a computer contained inside the housing, the main unit including a cathode-ray-tube display and a main-unit connector for providing electrical connection to signal paths in the computer to which a peripheral device must have access in order to operate in cooperation with the computer, the main housing including a bottom wall forming a plurality of locating recesses and associated guide surfaces that converge to the located recesses to guide locating pins into the locating recesses, the main-unit housing further forming a plurality of catch surfaces adapted for capture by latches on an expansion unit; and
   B. an expansion unit including an expansion-unit housing and a peripheral device contained in the expansion-unit housing, the expansion unit including an expansion-unit connector electrically connected to the peripheral device and adapted for operative engagement with the main-unit connector to provide electrical communication between the peripheral device and the signal paths of the computer to which the peripheral device must be computer to which the peripheral device must be with, the expansion-unit housing having a lower surface adapted to rest on a horizontal surface and having an upper surface adapted to support the main unit thereon and forming a mounting pin associated with each of the locating recesses and so located thereon that, when the mounting pins are simultaneously in contact with the guide surfaces associated with the associated locating recesses, the guide surfacs guide the expansion unit into a position in which the expansion-unit connector is in operative engagement with the main-unit connector, the expansion unit further including a plurality of latches adapted to capture the catch surfaces of the main-unit housing when the main unit is lowered onto the expansion unit and thereby secure the expansion unit to the main unit.

2. A computer assembly as defined in claim 1 wherein:
   A. the expansion-unit connector is free to move a limited distance with respect to the expansion-unit housing; and
   B. the bottom wall further forms connector guide surfaces that defines a connector opening that provides access to the main-unit connector, the connector guide surfaces being shaped to guide the expansion-unit connector into operative engagement with the main-unit connector.

3. A computer assembly as defined in claim 2 wherein:
   A. the latches are releasable by a user to permit separation of the units after the latches have captured the catch surfaces; and
   B. the expansion unit further includes a spring positioned to bear aganist the main unit, so that the spring exerts force to tend to separate the main and expansion units, when the expansion unit supports the main unit, whereby the spring assists in separating the units when the latches are released.

4. A computer assembly as defined in claim 3 wherein the force of the spring is great enough to lift at least part of the main unit, when the latches are released, out of the position assumed when all of the latches have captured the catch surfaces and to disengage the main-unit and expansion-unit connectors.

5. A computer assembly as defined in claim 1 wherein at least a bistable one of the latches is spring-located to have a stable catch position, in which the bistable latch secure the main unit to the expansion unit, and a stable release position, in which the bistable latch permits the main unit to be removed from the expansion unit, whereby the bistable latch remains in the release position when a user operates the bistable latch to the release position and the user can thereby remove the main unit without holding the bistable latch open.

6. A computer assembly as defined in claim 5 wherein the main housing has a return surface that bears against the bistable latch, when the bistable latch is in its release position and the main housing is being removed from the expansion housing, to return the bistable latch to its stable catch position as the main unit is removed from the expansion unit.

7. A computer assembly as defined in claim 6 wherein the main housing has a second return surface that bears against the bistable latch, when the bistable latch is in its release position and the main housing is being lowered onto the expansion housing, to return the bistable latch to its stable catch position as the main unit is lowered onto the expansion unit.

8. A computer assembly as defined in claim 1 wherein:
   A. the main unit further includes a power socket into which a power plug is inserted to supply power to the computer; and
   B. the expansion unit includes an interlock member that passes, when the main unit is lowered onto or removed from the expansion unit, through the position that a power plug assumes when the power plug is inserted into the power socket but forms an opening through which the power plug can extend into the power socket when the main until is latched onto the expansion unit, whereby the interlock member prevents the main unit from being lowered onto the expansion or removed therefrom while a power plug is plugged into the power socket.

* * * * *